United States Patent [19]
Lodi

[11] 3,947,656
[45] Mar. 30, 1976

[54] TEMPERATURE CONTROLLED CARTRIDGE HEATER

[75] Inventor: Frank Lodi, Niles, Ill.

[73] Assignee: Fast Heat Element Manufacturing Co., Inc., Elmhurst, Ill.

[22] Filed: Aug. 26, 1974

[21] Appl. No.: 500,565

[52] U.S. Cl. ............... 219/243; 156/515; 219/482; 219/505; 338/238
[51] Int. Cl.² .......................................... H05B 1/00
[58] Field of Search .......... 219/243, 241, 322, 328, 219/330, 331, 335, 342, 355, 366, 441, 377, 523, 534, 538, 481, 482, 439, 505; 338/226, 238, 243; 156/515, 583; 83/371

[56] References Cited
UNITED STATES PATENTS

| | | | |
|---|---|---|---|
| 2,777,931 | 1/1957 | Bundegaard et al. | 219/539 X |
| 3,113,198 | 12/1963 | Shinn | 219/243 X |
| 3,305,820 | 2/1967 | Lennox | 338/243 X |
| 3,360,693 | 12/1967 | Fickweiler | 219/505 X |
| 3,519,795 | 7/1970 | Kinney | 219/335 X |
| 3,614,387 | 10/1971 | Wrob | 219/328 |
| 3,678,247 | 7/1972 | Sawa et al. | 219/501 |

FOREIGN PATENTS OR APPLICATIONS

| 930,351 | 1/1948 | France | 219/241 |

*Primary Examiner*—C. L. Albritton

[57] ABSTRACT

A temperature controlled electric heater for severing a web of vinyl film, which includes a metallic sheath having internal heater elements arranged in a ceramic core and has a thermistor nested in the core and in surface contact with the sheath for sensing the temperature of the heater, the sheath being adapted to heat sever the vinyl film web on contact therewith.

9 Claims, 6 Drawing Figures

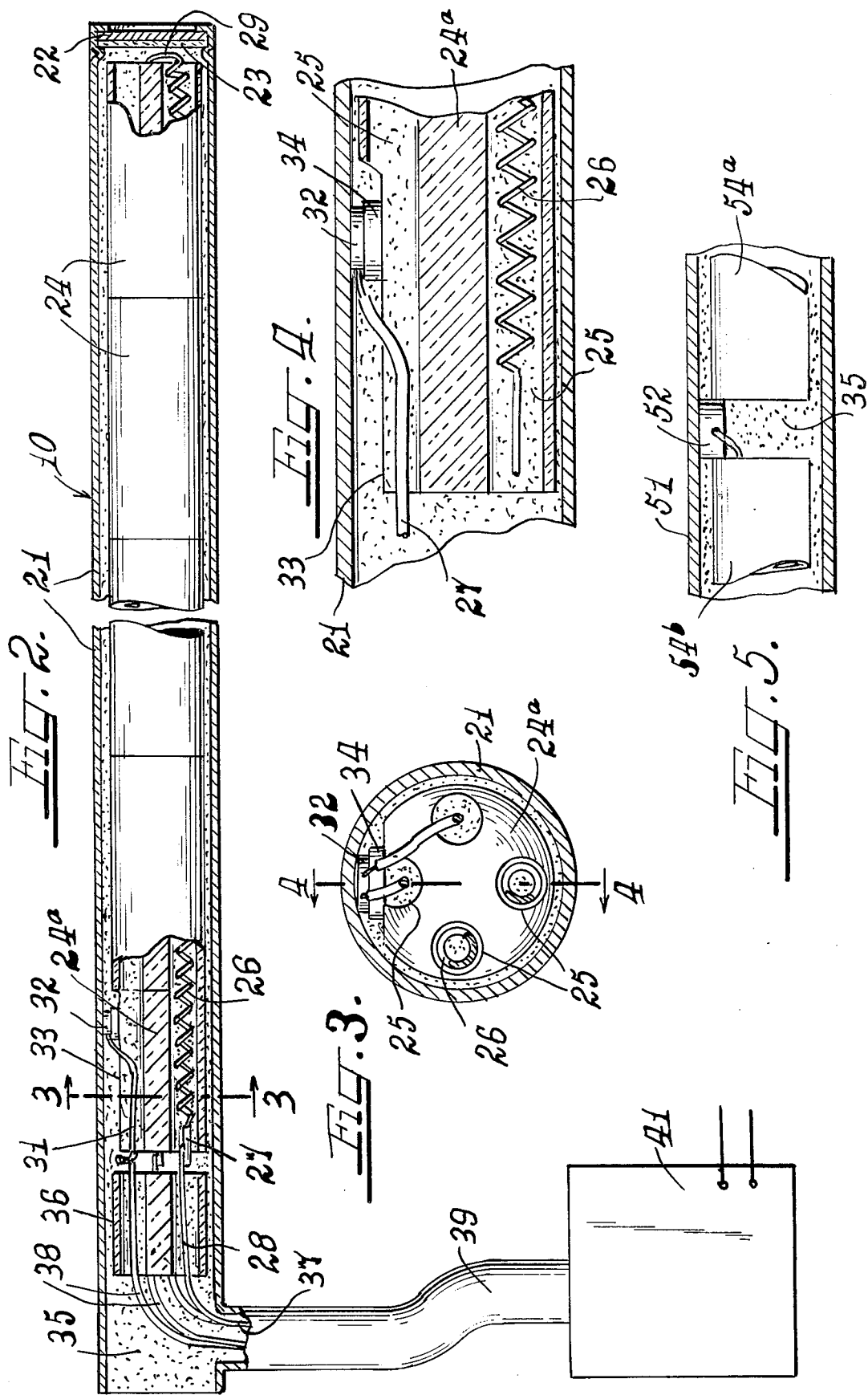

TEMPERATURE CONTROLLED CARTRIDGE HEATER

The invention relates to improvements in cartridge type electric heaters and is more particularly concerned with heaters of a kind useful in apparatus for severing vinyl film, such as in supermarket meat and produce wrapping operations. Severing such films requires a substantially constant controlled heat, usually at a temperature of about 275°F. when severing a poly vinyl chloride film of an average thickness of 7/10 mil., because the heater itself is used as the tool for cutting the film. If the heater is too cool (below about 270°F. in the foregoing example), the vinyl film will be frayed or torn, and possibly not even cut, so that the packaging operation is delayed, inhibited or inefficient. If the heater is too hot (above about 290°F. in the foregoing example), the vinyl film is burned and produces a smoke or vapor believed toxic to the operator of the apparatus (see "Health Hazard Evaluation Determination", Report 72–53, issued Sept., 1973, by the United States Department of Health, Education and Welfare, Hazard Evaluation Services Branch, NIOSH, Cincinnati, Ohio).

Heretofore, the control of the heater temperature was dependent upon the presence of a thermostat or thermocouple in the circuit of the heating elements of the heater. However, such units operate between an excessive range of temperatures or sense temperature remote from the severing surface, and hence it is impossible to maintain the temperature of the heater at a pre-set level within a range of close tolerance without sophisticated and expensive control equipment.

The present invention utilizes a thermistor or thermal resistor which is a semi-conductor having a large resistance change per degree of temperature change. The thermistor is placed in direct surface contact with the heater sheath as to be sensitive to the temperature at the severing point, and which is operated to maintain the sheath temperature at a pre-set level with variations of but a few degrees, to avoid the dangers of inadequately severing the film or burning the vinyl.

Although thermistors are available in many forms, it is preferred to use a disc or bead type insulated thermistor. Such thermistors comprise a mixture of metallic oxide, such as manganese, nickel, cobalt, iron or uranium, which are subjected to several tons of pressure and formed in a die to produce a thermistor of a desired shape. The formed thermistors are sintered and then coated with silver on its faces, and they may be of any size from about .05 inches to 1 inch in diameter. In the present disclosure, a very small disc or bead thermistor is utilized, because of space and mounting criteria hereinafter more fully discussed. Preferably, the thermistor is epoxy encapsulated to insulate possible shorting of its leads or body against the heater sheath when placed in operable position. In use, the thermistor is arranged within the heater sheath in firm contact with the inside surface thereof at its severing surface, so as to assume the temperature of the sheath which also contains the electric heater elements.

Preferably, the heater is horizontally disposed and mounted on a wrapping table, so that a package may be wrapped with the vinyl film on the table and the wrapped film may then be heat severed from its trailing web by passing the web adjacent the wrapped package over the heater.

It is therefore an object of the invention to provide a heater capable of severing a web of vinyl film of the character referred to.

Another object of the invention is to provide a cartridge heater with a temperature controlling thermistor formed as an integral part thereof.

Another object is to provide an electric heater with a solid state temperature control element.

Another object is to provide a heater with novel means to firmly mount a thermistor within its sheath.

Another object is to provide an electric current control means for an electric heater that is devoid of moving parts.

Another object is to provide a heater of the character referred to which is very inexpensive and simple to manufacture and one which is very efficient and accurate in its use.

Other objects and advantages of the invention will become apparent with reference to the following description and accompanying drawings.

In the drawings:

FIG. 2 is a longitudinal section view of the heater assembly showing the medial area broken away and the core in partial elevation.

FIG. 3 is an enlarged transverse sectional view of the heater taken substantially on line 3 — 3 of FIG. 2.

FIG. 4 is a fragmentary sectional view taken on line 4 — 4 of FIG. 3.

FIG. 5 is a fragmentary sectional view showing a modified arrangement for mounting the thermistor between core sections.

Figure 1:
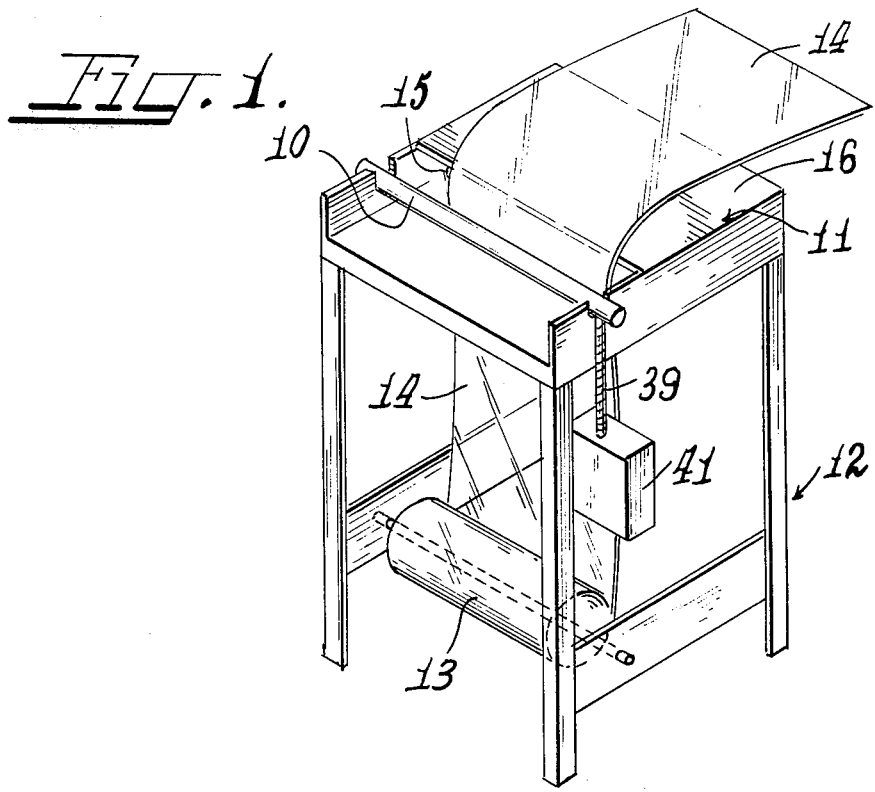
FIG. 1 is a perspective view showing the heater assembly mounted on a typical wrapping table.

Referring to the exemplary disclosure of the heater assembly shown in the accompany drawings and particularly to FIG. 1, the heater assembly 10 preferably is mounted horizontally on and slightly below the wrapping surface 11 of a conventional supdrmarket p[ckaging apparatus 12. Ths apparatus includes a supply of vinyl film 13 having a web 14 extending therefrom and which is threaded under tension through a slit 15 and over a flat area 16 of the wrapping surface 11. A package to be wrapped is placed over the web 14 and flat area 16 and the vinyl film is wrapped around the package. After the package is wrapped, the film web trailing from the wrapped package is brought into contact with the heater assembly 10 and the web is heat severed. The wrapped package may then be placed on a hot plate to seal the film edges.

The electric heater assembly 10 comprises a tubular sheath 21, preferably of stainless steel and of [ny required length. The tube is closed at one end by an end disc 22 having a mica wafer overlying the inside surface of said end disc. Arranged with the sheath through substantially its entire length is a ceramic core preferably comprised of a plurality of like sections 24. These sections each have a set of four bores or holes 25 extending axially therethrough, which bores are in register one with another to provide continuous passages contiguous with the length of the core.

Two of the passages 25 each contain a heating element, such as the nickel-chrome resistance coils 26, as shown. The coils have terminal posts 27 projecting out of one end of the core, to which are connected electric conductor wires 28. The remote ends of the coils 26 are connected together with a lead 29, usually formed by stretching the wire of the coils at the connecting point between them.

The remaining two passages or holes 25 in the core section 24a at the lead-in end of wires 28 leading to the heater coils 26 have lead-in wires 31, connected to the thermistor 32. As best shown in FIGS. 3 and 4, the said core section 24a has a flat area 33 on its perimeter surface to accommodate the thermistor. The thermistor comprises, as stated above, a disc or bead, which is preferably epoxy encapsulated and insulated to prevent unintended shorting of its leads against the sheath, and which may be seated on a resilient pad 34 of dielectric thermal insulating material arranged on the flat surface 33 of core section 24a. This pad functions to heat insulate the thermistor from the direct heat of the coils and to urge the thermistor into firm contact with the inside surface of the sheath 21. All voids in the sheath are filled with magnesium oxide powder 35.

Figure 6:
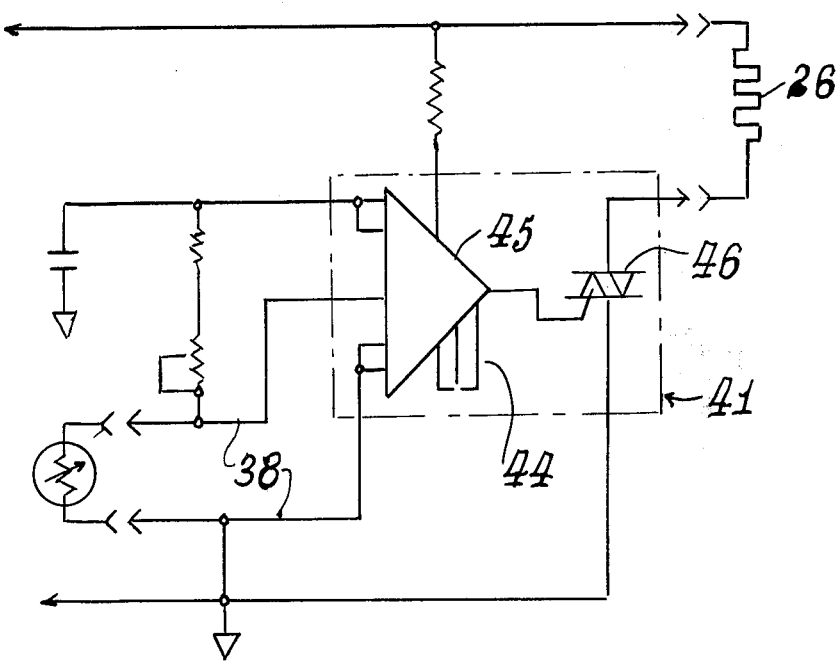
FIG. 6 is a schematic of the electric circuit.

The lead wires 28 and 31 are threaded through a ceramic cap 36, and thence out of the sheath, and are connected to respective lead wires 37 and 38 and in armored cable 39. The cable 39 is secured to the housing of a temperature controller 41. As best shown in the FIG. 6 circuitry, the leads 38 leading from the termistor are connected in the temperature controller 41 to one leg of a bridge circuit 42 having a resistor 43 in another leg and an integrated circuit 44 across the output. This integrated circuit 44 comprises a comparator-detector 45 with its own current supply, such as an RCA CA3079, triggering a conventional triac 46, such as a GE SC-136B. The heater coils 26 are connected to another leg of the integrated circuit 44 through its triac 46. When the thermistor becomes hot, reflecting the temperature of sheath 21, electrical resistance is decreased, and that change in resistance is read by the comparator-detector 45, which generates a signal to trigger the triac 46 into a nonconducting condition to shut off passage of current through heater coils 26. When the thermistor cools, electrical resistance is increased and that change in resistance is read by the comparator-detector 45, which generates a signal to trigger the triac 46 into conducting condition to allow passage of current through heater coils 26. The triac preferably is a zero voltage switch device capable only of being placed in conducting and non-conducting condition.

Thus, the alternate heating and cooling of the thermal resistor or thermistor, which is extremely heat sensitive, will control on and off of the voltage applied to the heater coils, thus maintaining the sheath temperature at a pre-set level with the close temperature tolerances desired, so that as the temperature applied to the thermistor increases the electrical resistance decreases, and as the temperature decreases the electrical resistance increases.

In the FIG. 5 embodiment, the thermal resistor or thermistor 52 is sandwiched between adjacent core sections 54a and 54b and protrudes slightly from the plane thereof as to contact the sheath 51. The voids in the sheath are filled with magnesium oxide powder 35 to hold the thermal resistor, coil sections and heater coils in place.

Preferably, the sheath 21 or 51 (see FIGS. 4 and 5, respectively) is roughen, as by sand blasting, as such roughening has been found to aid release of the film from the heater during the severing operation. While a triac 46 has been shown and described, any positive switching device may be utilized for this switching function, such as an SCR or transistor. Inasmuch as the thermistor 32 shown in the circuit has a negative temperature coefficient, the integrated circuit 44 is of a type adaptable to respond to negative changes in resistance, but if a thermal resistor having a positive temperature coefficient were utilized the integrated circuit would be modified to detect, compare and switch upon positive changes in resistance.

Although I have described preferred embodiments of the invention in considerable detail, it will be understood that the description thereof is intended to be illustrative only rather than restrictive, as details of the structure may be modified or changed without departing from the spirit or scope of the invention. Accordingly, I do not desire to be restricted to the exact construction shown or described.

I claim:

1. An electric heater assembly for severing a web of plastic film at a given temperature, comprising a metallic sheath having an outside roughened surface and adaptable to contact said plastic web, dielectric core means within and substantially coextensive with said sheath, a longitudinal passage within said core means, a heating element extending through and secured in said passage, a thermal resistance body arranged between said sheath and core means but insulated from said heating element and in surface contact with said sheath for sensing the temperature of said sheath, a circuit connecting said heating element and said thermal resistance body with a source of electric current, and means in said circuit responsive to the temperature sensed by said thermal resistance body for controlling the flow of current to the heating element to maintain said sheath at said given temperature.

2. The heater assembly recited in claim 1, wherein said circuit includes lead wires extending out of one end of said sheath which connect said control means exterior of said sheath.

3. The heater assembly recited in claim 1, wherein said circuit control means comprises an integrated circuit including a comparator — detector and a switching device.

4. The heater assembly recited in claim 1, wherein said circuit control means is connected across the output of a bridge circuit.

5. The heater assembly recited in claim 1, wherein the core means comprises axially aligned sections and the thermal resistance body is arranged between two adjacent sections.

6. The heater assembly recited in claim 1, wherein all voids in the sheath are filled with magnesium oxide powder.

7. An electric heater assembly for severing a web of plastic film at a given temperature, comprising a metallic sheath adaptable to contact said plastic web, a dielectric core means in said sheath substantially coextensive therewith, at least one longitudinal passage within said sheath, a heating element extending through said passage and secured therein by said core means, a thermal resistance body within said sheath and arranged between said sheath and core means and substantially in surface contact with said sheath, a dielectric thermal insulation pad arranged between said thermal resistance body and said core means, a circuit connecting said heating means and said thermal resistance body with a source of electric current, and means in said circuit for controlling the flow of current to the heating element to maintain said sheath at said given temperature.

8. The heater assembly recited in claim 7, wherein the sheath is tubular.

9. The heater assembly recited in claim 7, wherein the core has a flat surface upon which the pad and thermal resistance body are seated.

* * * * *